REEL CLAMP FOR MAGNETIC TAPE RECORDERS

Filed Feb. 27, 1952 2 Sheets-Sheet 1

INVENTOR.
RICHARD H. RANGER
BY
Gaylor, Cefelli & Jurick
ATTORNEYS

Dec. 14, 1954 R. H. RANGER 2,696,950

REEL CLAMP FOR MAGNETIC TAPE RECORDERS

Filed Feb. 27, 1952 2 Sheets-Sheet 2

INVENTOR.
RICHARD H. RANGER
BY
Gaylor, Cifelli & Jurick
ATTORNEYS

United States Patent Office 2,696,950

Patented Dec. 14, 1954

2,696,950

REEL CLAMP FOR MAGNETIC TAPE RECORDERS

Richard H. Ranger, Newark, N. J.

Application February 27, 1952, Serial No. 273,757

5 Claims. (Cl. 242—46.6)

This invention relates to apparatus for use on magnetic tape recording apparatus and more particularly to a novel clamp for securing large-capacity reels to the conventional spindles which are a standard part of the recording apparatus.

In the magnetic tape recording art the tape-carrying reels are of two standard sizes, namely, a relatively large-capacity reel known as a N. A. B. reel and a relatively small-capacity reel known as the motion picture reel. The small reels are provided with a central, relatively small diameter hole, having a keyway, and the reel is fastened in operating position by a spring-biased latching mechanism associated with the standard spindle. The large reels, on the other hand, include a hub having a relatively large, central opening therein. Since such opening is many times larger than the standard spindle diameter it is necessary to employ an adapter to secure the reel to the spindle. Such adapters as are presently available for this purpose are attached to the individual reels. In general, the attachment of present adapters to the reels is inconvenient and, in addition, a single user of an industrial recorder must have available a fairly large number of such adapters to carry on normal operations.

A device made in accordance with my invention is adapted for use on the conventional spindle of a magnetic tape recorder, and may be considered as forming a part of the recorder as distinguished from prior adapters which form part of the reel. While retained in place on the recorder, my device provides a simple means for placing large size reels into and out of operative position and provides a firm clamping action to prevent undesirable axial and/or rotational movement of the reel relative to the spindle. Further, the device adapts itself to normal variations in the diameter of the hole in the reel hub and is adapted to retain two reels superposed one on the other.

An object of this invention is the provision of a novel reel clamp for attaching large capacity reels to the standard spindle of a tape recorder.

An object of this invention is the provision of a spring-actuated reel clamp adapted for removable attachment to the conventional spindle of a tape recorder said clamp including selectively-operable means for frictionally securing large reels in operative position on the recorder.

An object of this invention is the provision of a reel clamp for magnetic tape recorders and comprising a pair of axially spaced members, pivotally-mounted toggle elements carried by one of said members, and axially-extending spring members, each spring member having one end secured to one of the toggle members and the other end secured to the other of said axially-spaced members, and said spring members adapted for frictional engagement with the walls defining a central opening in the reel.

An object of this invention is the provision of a reel clamp for magnetic tape records said clamp comprising a disc, a circular member in parallel spaced relation to said disc, a plurality of radially-extending members pivotally attached to said circular member, and a plurality of individual leaf springs each having one end rigidly secured to the disc and the other end pivotally secured to the said radially-extending members, said springs providing a biasing force resulting in a toggle-action movement of said radially-extending members in response to relative movement between the said circular member and disc.

These and other objects and advantages will become apparent from the following description when taken with the accompanying drawings. It will be understood the drawings are for purposes of illustration and are not to be construed as defining the scope or spirit of the invention, reference being had for the latter purpose to the appended claims.

In the drawings wherein like reference characters denote like parts in the several views.

Figure 2:
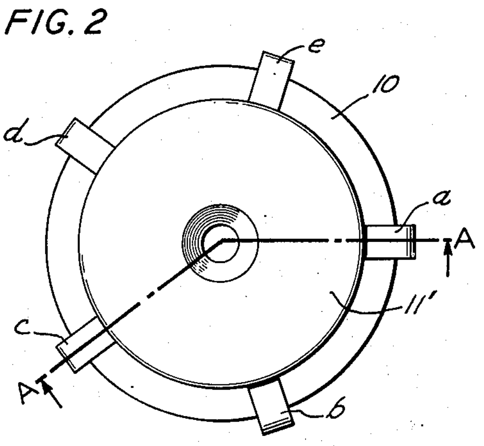
Figure 2 is a top view of the clamp.
Figure 3:
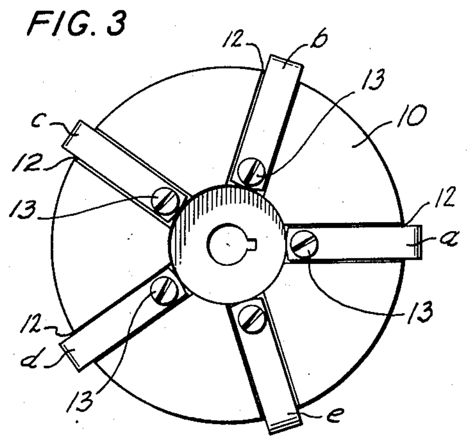
Figure 3 is a bottom view of the clamp.

Reference is now made to Figures 1 to 4 showing a reel clamp made in accordance with this invention. The device comprises a circular, metal base plate 10 and a circular flange member 11 axially spaced therefrom, the latter terminating in a circular handle section 11' having a knurled periphery. These members 10, 11 are spaced apart a distance determined by the effective length of the leaf springs *a*, *b*, *c*, *d* and *e*, each spring having a lower end offset and lying in the radial channels 12 formed in the bottom surface of the base plate 10, and each such spring end is secured to the plate as by the screws 13. The other end of each spring is pivotally attached to suitable pins 15 spanning the legs of the U-shaped members or arms 16. It may here be pointed out that these upper spring ends are pivotally secured to the associated pins 15 by curling the end of the spring loosely around the pin, as shown in the cross-sectional view of Figure 4. The member 11 is provided with a series of circumferentially-spaced recesses, each recess accommodating a pin 17 passing through a clearance hole in the shank of the associated U-shaped members 16. These recesses, in the periphery of the member 11, are so formed that the U-shaped members 16 are relatively free for pivotal movement in the direction of the base plate 10, the extent of such movement being determined by the effective, axial length of the individual leaf springs, as is clear from Figure 1. However, the extent of the pivotal movement of the members 16 in the opposite direction, that is, toward the handle disc 11', is defined by the upper edges 18 of the recesses, as will be described in more detail below.

Figure 1:
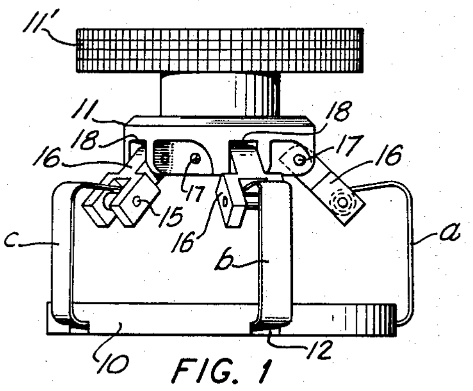
Figure 1 is a side view showing my novel reel clamp in its normal position.

When the relative spacing between the base plate 10 and the circular member 11 is a maximum, as shown in Figure 1, the central portion of each leaf spring extends substantially parallel to the common axis of the plate 10 and member 11. The effective circumference defined by the outer surfaces of the leaf springs corresponds substantially to the diameter in the hub of the large tape reel. This will be apparent by reference to Figure 6 which is a top plan view showing the clamping device extending through the hole 20 in the hub 21 of the reel 22.

Referring again to Figure 1, it will be apparent that if the handle disc 11' and plate 10 are moved toward each other the forced, pivotal movement of the U-shaped arms 16 will cause the upper ends of the leaf springs to move outwardly to a maximum extent that coincides with the position wherein the pins 15 and 17 all lie in a single plane normal to the common axis of the plate 10 and member 11. When such critical point is exceeded, the radially-directed forces of the upper ends of the leaf springs will cause the U-shaped members to jump to the position shown in Figure 5, such movement of the U-shaped members pulling the circular member 11 further toward the base plate 10.

Figure 4:
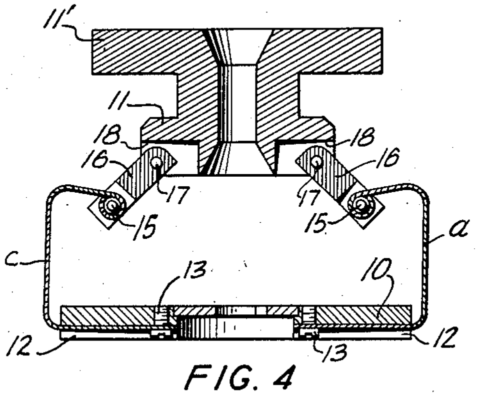
Figure 4 is a cross-sectional view taken along the line A—A of Figure 2.
Figures 5, 6:
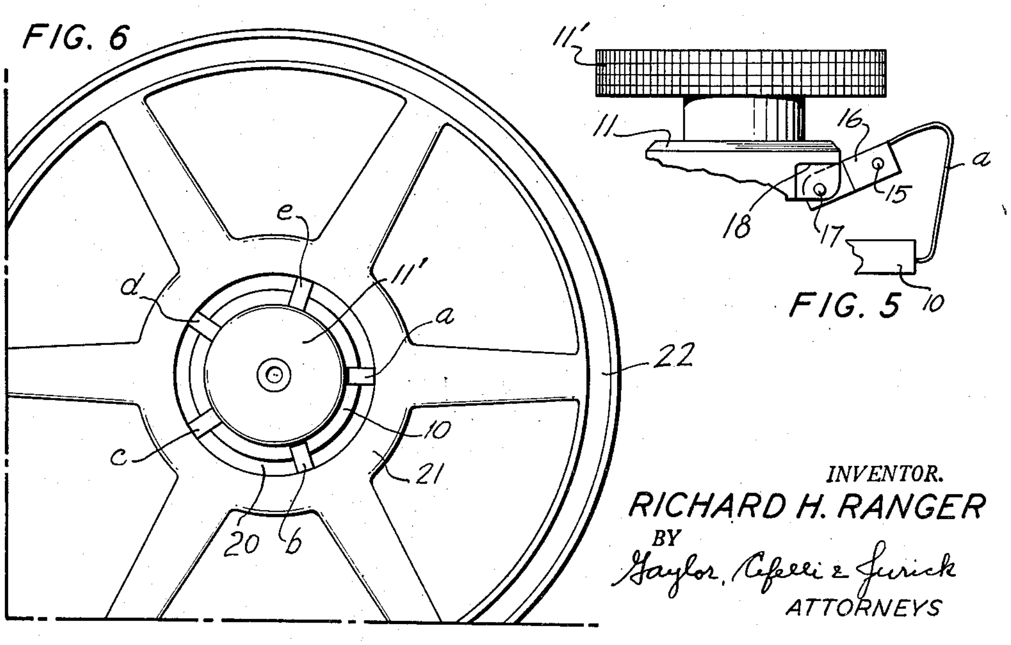
Figure 5 is a fragmentary side view similar to Figure 1 but showing the device in the reel-clamping position.
Figure 6 is a top plan view, of reduced scale, showing the reel-clamp disposed within the hole in the hub of a large-capacity reel.

The limit of such movement of the member 11 toward the plate 10 is shown in Figure 5 wherein the top surface of the shank of each U-shaped member 16 strikes the upper edge 18 of the recesses formed in the member 11, see also Figure 4. Thus, movement of the member 11 toward the plate 10 results in a toggle action of the U-shaped members. When the member 11 is pressed toward the plate 10 beyond the point of alinement of the pivot pins 15, 17 the U-shaped members snap to their upper position as shown in Figure 5. Upon a reverse motion, brought about by pulling the member 11 away from the plate 10, the U-shaped members snap to their lower position as shown in Figure 1. The parts are so designed and proportioned that the radial distance between the pivot pins 15 and the axis of the member 11 is greater when the U-shaped members are disposed in their extreme upper position (Figure 5) than when these members are disposed in their extreme lower position (Figure 1). Consequently, when the device is in the position shown in Figure 1 the leaf springs are disposed in substantially parallel relationship and fall on the surface of a right cylinder. On the other hand, when the device is in the position shown in Figure 5 the springs diverge outwardly from the base plate 10 and fall on the surface of a cone having an apex beyond the base plate. It is this bowing-out action of the leaf springs, in response to the above described toggle action, which results in a frictional clamping of the reel as will now be described further.

Figure 7:
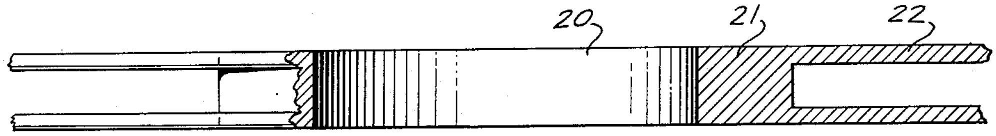
Figure 7 is a fragmentary, central sectional view of the reel showing the central hole in the reel hub.
Figure 8:
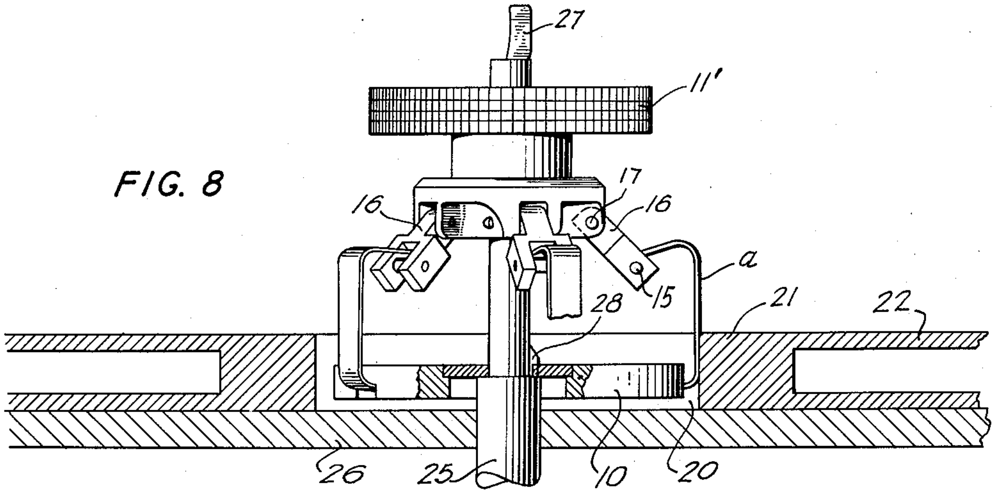
Figure 8 is a fragmentary view, with parts broken away, illustrating the reel shown in Figure 7, in position over the reel clamp that is secured in place over a conventional spindle.
Figure 9:
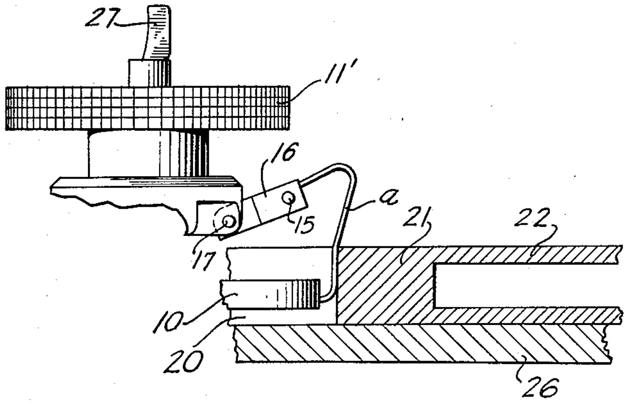
Figure 9 is a fragmentary view similar to Figure 8 and showing the reel-clamping action of the reel clamp.

Reference is now made to Figures 7–9. Figure 7 is a transverse, fragmentary sectional view taken through a large-capacity reel of the type shown in Figure 6. In actual practice the two spoke members, forming the reel flanges, are secured to opposite surfaces of a plastic disc that includes the central hole 20 and various radial notches and slots for receiving the tape end and other purposes. Since the reel forms no part of the present invention the hub 21 is shown of solid construction for purposes of describing the reel-clamping action of my novel reel clamp. As shown in Figures 8 and 9, a conventional spindle 25 extends upwardly through an aperture in the top plate 26 of a tape recorder. Two such spindles, selectively power driven to provide a forward and reverse tape movement, are provided on each machine, as is well known in this art. The spindle is provided with a spring-biased latching mechanism whereby a small-capacity reel may be secured to the spindle in operating position. For present purposes, the latching mechanism is shown as a pivoted lever 27 having an inner end 28 extending outwardly through a longitudinal slot in the spindle and overlying the upper surface of the base plate 10 of my reel clamp. Finger movement of the outer end of the lever toward the spindle axis withdraws the inner end 28 into the spindle whereupon the clamping device may be removed from th spindle. It will, therefore, be clear that the spindle is of conventional construction for normal use with the small-capacity tape reels. When a large-capacity reel is to be used, my clamping device is placed over the spindle as shown in Figure 8. The large-capacity reel may now be placed over the reel clamp when the latter is in the normal position, that is, with the U-shaped members 16 disposed in their lower position wherein the effective diameter of the leaf springs corresponds substantially to the diameter of the hole 20 in the reel hub 21. By firmly pressing the handle disc 11' toward the base plate 10 the resulting toggle action, above described, expands the effective diameter of the leaf springs as is shown in Figure 9. The lower portion of each leaf spring presses against the reel hub 21 and the upper portion of each spring forms a more or less smooth curve over the upper surface of the reel and exerts a considerable radially-directed force against the cooperating U-shaped member 16. The frictional forces exerted against the reel hub, by the lower portion of each leaf spring, firmly lock the reel to the clamping device so as to prevent relative rotation of the reel and clamping device, and the curved, expanded, upper portion of each spring prevents axial movement of the reel relative to the clamping device. Since the clamping device is firmly anchored to the spindle, the reel effectively is locked to the spindle for proper operation and can be removed simply by prying the member 11' upwardly to bring about a reverse toggle action whereby the leaf springs return to their normal position as shown in Figure 8. I prefer to set the normal diameter of the leaf springs so that a slight pressure is required to insert the reel in position over the clamping device and to remove same. However, it will be apparent that a considerable variation may exist in the actual diameter of the hub holes in the reels without such variations effecting the positive clamping action of my device. The slightly greater or smaller hub holes merely reduce or increase, respectively, the actual pressure of the leaf springs against the hub when the clamp is placed in the reel-locking position. In any practical case, the spring pressure is more than ample to provide a positive reel locking action. Further, a single reel clamp is adapted to secure two tape reels superposed one over the other as will be apparent from a consideration of Figures 8 and 9. In the latter case the only requirement is that the axial length of the leaf springs be somewhat greater than the thickness of two reels.

Having now described my invention in accordance with the Patent Statutes what I desire to protect by Letters Patent is set forth in the following claims.

I claim:

1. A snap-action reel clamp comprising a circular base having a central hole therein; a handle member including a flange and having a central hole therein alined with the hole in the base; a plurality of circumferentially-spaced rigid arms having inner ends pivotally connected to the flange, each of said arms being rotatable in a plane normal to that of the flange and through-out an angle intersected by the plane of the flange; a leaf spring associated with each arm, each spring having one end secured to the base a central portion normally substantially parallel to the common axis of the base and flange and the other end offset and pivotally secured to the outer end of the associated arm, said springs normally supporting the arms at a first predetermined angle with respect to the plane of the flange thereby resulting in a snap movement of the arms as the flange is moved toward the base through the critical angle wherein all pivotal connections of the arms are co-planar; and stop means carried by the flange and limiting such snap movement of the arms beyond the plane of the flange to an angle that is less than the said first predetermined angle.

2. The invention as recited in claim 1, wherein the base includes a plurality of radial channels and each spring includes an offset end disposed within one of the channels.

3. The invention as recited in claim 1, wherein the rigid arms comprise a U-shaped member having spaced legs terminating in a shank, the shank of each member being pivotally connected to the said circular member and the end of the associated spring being pivotally connected to a pin carried by the spaced legs of the member.

4. A reel clamp for securing a large capacity reel to the conventional spindle of a magnetic tape recorder said clamp comprising a circular upper plate having a central hole therein; a circular base plate axially spaced from the upper plate and having a central hole therein, said base plate having a diameter exceeding that of the upper plate; a plurality of radially-extending channels in a surface of the base plate; a plurality of leaf springs each having an end disposed within one of said channels and secured to the base plate and each spring extending beyond the periphery of the base plate and offset in a plane substantially normal to that of the base plate; a curled end on the opposite end of each leaf spring; a plurality of recesses in the periphery of the upper plate; a plurality of rigid arms extending radially from the upper plate, each arm including a shank partially disposed within one of the recesses and a U-shaped portion; individual pivot pins passing through the shank of each arm and spanning the associated recess; and, individual pivot pins carried by each of the U-shaped portions of the arm, said latter pins passing through the curled end of the associated spring.

5. The invention as recited in claim 4, and including means limiting the pivotal movement of the arms when the upper plate is moved toward the lower plate.

References Cited in the file of this patent

UNITED STATES PATENTS

| Number | Name | Date |
|---|---|---|
| 1,674,709 | Thomas | June 26, 1928 |
| 2,499,869 | Luchansky | Mar. 7, 1950 |

FOREIGN PATENTS

| Number | Country | Date |
|---|---|---|
| 354,149 | Germany | June 1, 1922 |
| 403,854 | Germany | Oct. 9, 1924 |
| 249,949 | Italy | Aug. 25, 1926 |